Figures 1, 3, 5:
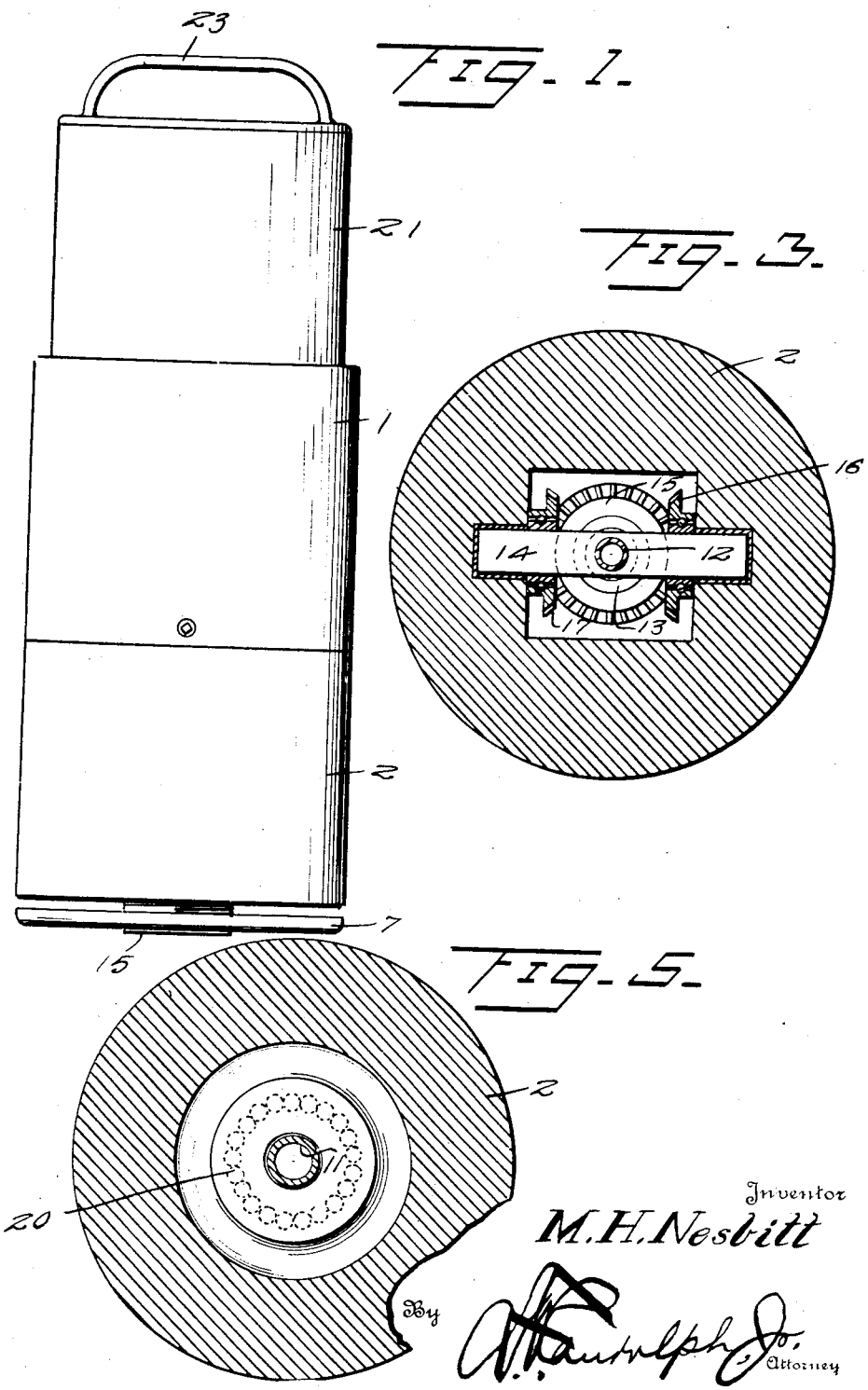

Dec. 13, 1927.

M. H. NESBITT 1,652,833

ELECTRIC DRILLING MACHINE

Filed Sept. 9. 1924    2 Sheets-Sheet 1

Inventor
M. H. Nesbitt

Dec. 13, 1927.
M. H. NESBITT
1,652,833
ELECTRIC DRILLING MACHINE
Filed Sept. 9. 1924  2 Sheets-Sheet 2
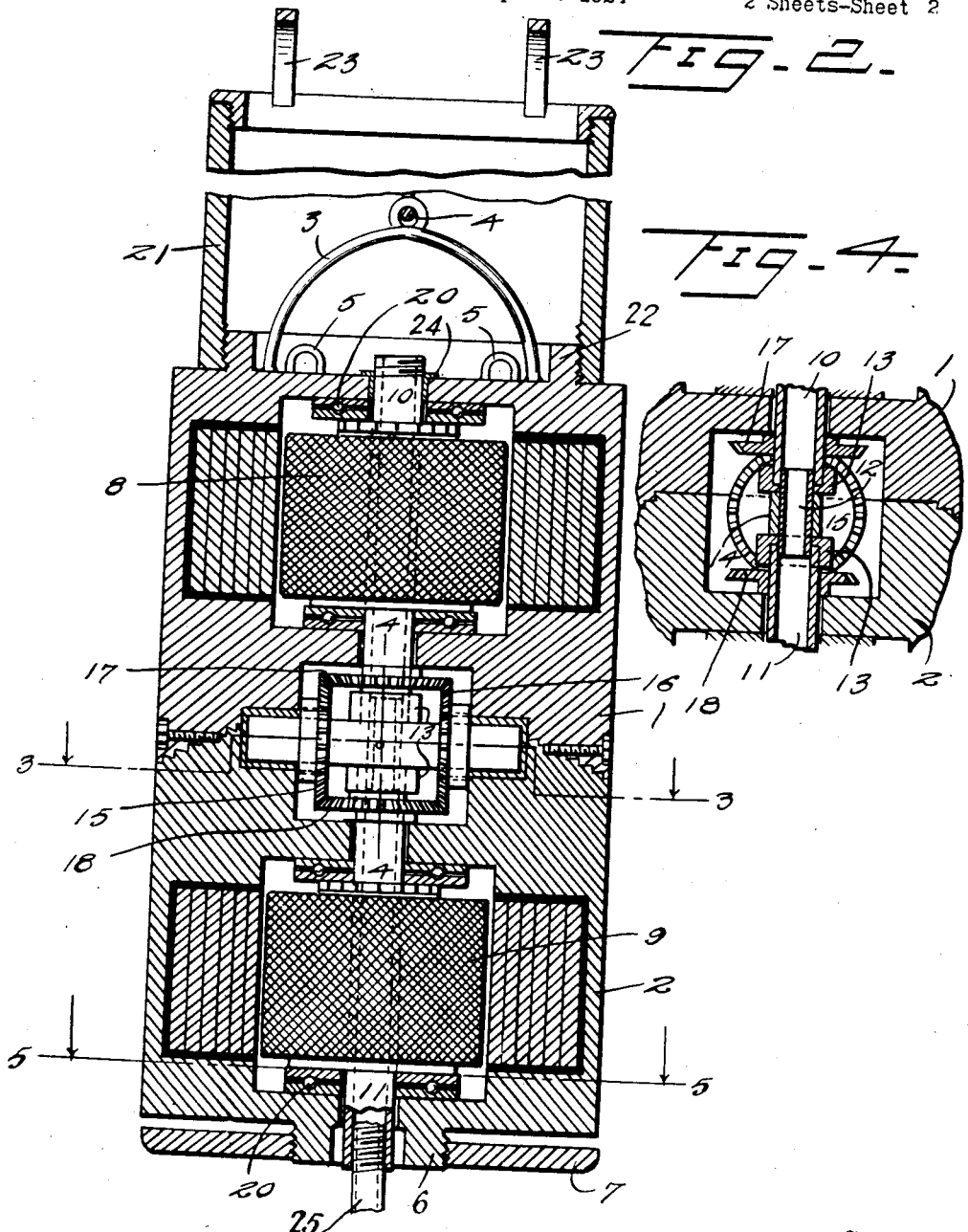

Patented Dec. 13, 1927.

1,652,833

UNITED STATES PATENT OFFICE.

MILTON H. NESBITT, OF ASHEVILLE, NORTH CAROLINA.

ELECTRIC DRILLING MACHINE.

Application filed September 9, 1924. Serial No. 736,738.

The invention has for its object the provision of a drilling machine which may be utilized for boring deep wells without necessitating the use of drill rods and which may be raised or lowered by means of a rope or cable, the machine being counter-balanced and weighted if needs be to apply pressure when required, the weight being interchangeable to admit of varying the pressure as required.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the specification,

Figure 1 is a side view of an electric drilling machine embodying the invention, Figure 2 is a vertical central sectional view thereof, Figure 3 is a transverse sectional view on the line 3—3 of Figure 2, Figure 4 is a detail longitudinal section on the line 4—4 of Figure 2, and Figure 5 is a horizontal sectional view on the line 5—5 of Figure 2.

Corresponding and like parts are referred to in the following description and designated in the several views of the drawings by like reference characters.

The casing comprises similar sections or parts 1 and 2 which may be connected in any preferred way. A bail 3 is fitted to the upper portion of the casing to receive a hoisting rope or cable 4 and eyes or hooks 5 may be applied to the upper portion of the casing for a like purpose. An extension 6 is provided at the lower end of the casing to receive weights 7 to admit of increasing or decreasing the weight of the machine as a whole according to the pressure required when the machine is in operation.

Electric motors are located in opposite end portions of the casing and these motors are so wound as to cause their shafts to revolve in opposite directions. The motors are indicated generally by the numerals 8 and 9 each consisting of a field which is stationary with the casing and an armature which is rotatable, each of the armatures including a hollow shaft denoted by the numerals 10 and 11 respectively. A hollow coupling 12 is connected to the inner or opposing ends of the hollow shafts 10 and 11 by slip joints or swivel couplings 13 whereby provision is had for opposite rotation of the shafts 10 and 11. A transverse shaft 14 mounted in the casing provides a support for the coupling 12 and for the gear wheels 15 and 16 which are in mesh with gear wheels 17 and 18 fast to the inner ends of the respective shafts 10 and 11. Ball bearings 19 reduce the friction between the gear wheels 15 and 16 and the shaft 14 to the smallest amount possible. Ball bearings 20 coact with the respective shafts 10 and 11 to reduce the friction to the smallest amount. The bit or analogous tools (not shown) is adapted to be connected to the lower end of the shaft 11, and a hose pipe (not shown) is adapted to be coupled to the upper end of the shaft 10 to supply water or air thereto when the machine is in operation.

A catcher 21 is adapted to be fitted to the top of the casing and receives the cuttings and any gravel that may fall into the opening during the drilling thereof. The catcher 21 is preferably detachably connected to the casing and for this purpose the latter is provided with a collar 22 to which the catcher 21 is threaded. Bails 23 or like elements are applied to the upper portion of the catcher 21 and provide convenient means for connecting the hoisting rope or cable thereto when the same may not be conveniently attached to the bail 3 or the elements 5. The collar 22 may form a part of the casing or be secured thereto in any preferred way. The cuttings carried upward by the water or air collect in the catcher 21 and do not tend to impede the action of the drill by collecting in the space between the casing and the walls of the bore and this catcher may be of any capacity and may be withdrawn from the opening as occasion may require to dump the cuttings and other accumulations therefrom. Packing 24 is provided around the shaft 10 to prevent dirt, cuttings, etc., in the catcher 21 getting into the motor chamber.

When a single motor is suspended in the air or in water by a rope or similar method and the shaft of the armature is kept from rotating while the current is on, the outside or field of the motor will rotate in the opposite direction from that of the armature.

In other words, a drill with all of the motors rotating in the same direction when suspended in a well would tend to rotate its outside part or field when the drill bit began to cut into the earth or rock, which cutting would tend to retard the rotation of the drill shafts 10 and 11. Then the force of the motors would be spent in rotating the outside or field part of the motors while the armatures and drill bit would be stationary. But with the present arrangement when the drill bit is retarded in its rotation while cutting earth or rock the tendency of the outside part of one motor to rotate in one direction is exactly offset by the tendency of the other motor to rotate in the opposite direction, and since the two motors are attached to the same casing, this outside rotation is impossible. The two motors are of the same horse power. In deep well drilling there is often met rock, sand, water, etc., and this arrangement will keep the outside part of the drilling machine from rotating no matter whether the machine is going through soft or hard material and it eliminates the need of any arrangement from the surface of the well to hold the drilling machine from rotating its outside part. Any method, such as arms, etc., on the outside of the drilling machine to hold it from rotating would not function when soft material, such as sand, loose earth, etc., is encountered.

A drill stem 25 is suggested as attached to the lower end of shaft 11.

What is claimed is:—

1. A drilling machine of the character specified comprising a casing, alined hollow shafts therein, a single tool driven by said shafts, a hollow coupling connecting the inner or opposing ends of the shafts, gearing forming connecting means between the shafts to cause them to rotate in reverse directions, and a motor for each of the shafts disposed within the casing and said motors being adapted to rotate the shafts in opposite directions.

2. A drilling machine comprising a casing, alined hollow shafts within the casing, a single tool driven by said shafts, a hollow coupling connecting the inner ends of the shafts, a transverse shaft forming a support for the hollow coupling, gear wheels loose upon opposite end portions of the transverse shaft, gear wheels fast to the inner ends of the hollow shafts and in mesh with the gear wheels loose on the transverse shaft, electric motors within opposite ends of the casing and associated with the shafts to rotate the same in reverse directions, means for attaching a hoisting rope or cable to the casing, and means for varying the weight of the casing to increase or decrease the pressure as required.

3. A drilling machine, comprising a casing a shaft arranged for rotation in said casing and adapted to engage a tool for rotation therewith, a motor to rotate said shaft, another shaft arranged axially of the first mentioned shaft for rotation in said casing, a motor to rotate the last mentioned shaft in reverse direction to the first mentioned shaft, and gearing connecting the adjacent ends of the two shafts to cause rotation of the tool by the combined action of both motors.

4. A drilling machine, comprising a casing adapted to be suspended, a shaft arranged for rotation in said casing and adapted to engage a tool for rotation therewith, an electric motor having its field stationary with the casing and its armature carried by the shaft, another shaft arranged axially of the first mentioned shaft, an electric motor having its field stationary with the casing and its armature carried by the second shaft, said motors being wound to rotate the shafts in opposite directions to counteract the tendency of each other to rotate the casing around the shaft, and gearing connecting the adjacent ends of the two shafts to cause rotation of the tool by the combined action of both motors.

In testimony whereof I affix my signature.

MILTON H. NESBITT.